(12) United States Patent
Peng (10) Patent No.: US 11,456,013 B2
(45) Date of Patent: Sep. 27, 2022

(54) VIDEO DECODING CONTROL METHOD, ELECTRONIC DEVICE, AND STORAGE MEDIUM

(71) Applicant: GUANGDONG OPPO MOBILE TELECOMMUNICATIONS CORP., LTD., Dongguan (CN)

(72) Inventor: Deliang Peng, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/331,597

(22) Filed: May 26, 2021

(65) Prior Publication Data

US 2021/0287715 A1 Sep. 16, 2021

Related U.S. Application Data

(63) Continuation of application No. PCT/CN2019/102906, filed on Aug. 27, 2019.

(30) Foreign Application Priority Data

Nov. 27, 2018 (CN) .......................... 201811441950.2

(51) Int. Cl.
*H04N 5/93* (2006.01)
*G11B 20/00* (2006.01)
(Continued)

(52) U.S. Cl.
CPC ........ *G11B 20/00007* (2013.01); *G10L 25/57* (2013.01); *H04N 19/44* (2014.11); *G11B 2020/00072* (2013.01)

(58) Field of Classification Search
CPC ....... H04N 21/44008; H04N 21/42607; H04N 21/442; H04N 21/4316; H04N 21/443;
(Continued)

(56) References Cited

U.S. PATENT DOCUMENTS 9,785,442 B2 10/2017 Ould-Ahmed-Vall
10,514,955 B2 12/2019 Wu
(Continued)

FOREIGN PATENT DOCUMENTS

CN 101252618 A 8/2008
CN 102118612 A 7/2011
(Continued)

OTHER PUBLICATIONS

Supplemental Partial European Search Report Dated Nov. 11, 2021 from EP Application No. 19891423.6.,11 pages.
(Continued)

*Primary Examiner* — Robert Chevalier
(74) *Attorney, Agent, or Firm* — Bayes PLLC (57) ABSTRACT

Embodiments of the present disclosure disclose a video decoding control method and apparatus, an electronic device, and a storage medium. The method includes detecting, in response to detecting a plurality of application programs running in a split-screen mode, one or more application programs in a video playback state among the plurality of application programs; acquiring the one or more application programs detected in the video playback state to serve as one or more to-be-configured application programs; and providing a configuration to decode a video played by the one or more to-be-configured application programs in a manner of hard decoding.

19 Claims, 7 Drawing Sheets

(51) Int. Cl.
*H04N 19/44* (2014.01)
*G10L 25/57* (2013.01)

(58) Field of Classification Search
CPC .... H04N 21/4424; H04N 19/44; H04N 19/42; G11B 20/00007; G11B 2020/00072; G10L 25/57
USPC ........ 386/353, 354, 355, 356, 359, 343, 344
See application file for complete search history.

(56) References Cited

U.S. PATENT DOCUMENTS

| | | |
|---|---|---|
| 2007/0064901 A1 | 3/2007 | Baird et al. |
| 2012/0183040 A1 | 7/2012 | Fang |
| 2012/0320967 A1 | 12/2012 | Gao |
| 2015/0116342 A1 | 4/2015 | Haase et al. |
| 2017/0164041 A1 | 6/2017 | Ping |

FOREIGN PATENT DOCUMENTS

| | | |
|---|---|---|
| CN | 102479108 A | 5/2012 |
| CN | 103096163 A | 5/2013 |
| CN | 103716694 A | 4/2014 |
| CN | 104796768 A | 7/2015 |
| CN | 104837058 A | 8/2015 |
| CN | 105721921 A | 6/2016 |
| CN | 105740081 A | 7/2016 |
| CN | 105872755 A | 8/2016 |
| CN | 105898320 A | 8/2016 |
| CN | 105898496 A | 8/2016 |
| CN | 106210726 A | 12/2016 |
| CN | 106231051 A | 12/2016 |
| CN | 106331822 A | 1/2017 |
| CN | 106484537 A | 3/2017 |
| CN | 106658107 A | 5/2017 |
| CN | 106792066 A | 5/2017 |
| CN | 107087231 A | 8/2017 |
| CN | 109640179 A | 4/2019 |
| JP | 3750846 B2 * | 3/2006 |
| WO | 2016105802 A1 | 6/2016 |

OTHER PUBLICATIONS

International Search Report and the Written Opinion Dated Dec. 4, 2019 From the International Searching Authority Re. Application No. PCT/CN2019/102906.
The first Office Action Date Nov. 21, 2019 from from China Application No. 201811441950.2.
The second Office Action Dated Mar. 19, 2020 from from China Application No. 201811441950.2.
Notice of Allowance Dated Aug. 5, 2020 from from China Application No. 201811441950.2.
Supplementary Search Report Dated Mar. 1, 2022 From the Extended European search report(EESR) of the Application No. 19891423.6, 12 pages.
First Office Action with Examination report Dated Mar. 23, 2022 From the Indian Patent Application No. 202127028750, 6 pages.

* cited by examiner

VIDEO DECODING CONTROL METHOD, ELECTRONIC DEVICE, AND STORAGE MEDIUM

CROSS-REFERENCE TO RELATED APPLICATIONS

This application is a continuation of International Application No. PCT/CN2019/102906, filed on Aug. 27, 2019, which claims priority to Chinese Application No. 201811441950.2, filed on Nov. 27, 2018, the entire contents of which are incorporated herein by reference.

BACKGROUND

The present disclosure relates to the field of image processing, and more specifically, to a video decoding control method, apparatus, electronic device, and storage medium.

With the development of society, the application scope of electronic devices equipped with a screen continues to expand. For example, the screen is used to display images, such as pictures or videos. However, the display quality of most of the electronic devices will be severely affected due to problems of changes in surrounding light source and quality of video source to be played.

SUMMARY

In view of the above problem, the present disclosure proposes a video decoding control method, apparatus, electronic device, and storage medium to improve the above problem.

In a first aspect, the present disclosure provides a video decoding control method, which is applied to an electronic device, wherein the method includes detecting, in response to detecting a plurality of application programs running in a split-screen mode, one or more application programs in a video playback state among the plurality of application programs; acquiring the one or more application programs detected in the video playback state to serve as one or more to-be-configured application programs; and providing a configuration to decode a video played by the one or more to-be-configured application programs in a manner of hard decoding.

In a second aspect, the present disclosure provides a video decoding control apparatus, which is operated in an electronic device, wherein the apparatus includes an application program detection unit configured to detect, in response to detecting a plurality of application programs running in a split-screen mode, one or more application programs in a video playback state among the plurality of application programs; a to-be-configured program acquisition unit configured to acquire the one or more application programs detected in the video playback state to serve as one or more to-be-configured application programs; and a decoding control unit configured to provide a configuration to decode a video played by the one or more to-be-configured application programs in a manner of hard decoding.

In a third aspect, the present disclosure provides an electronic device, including one or more processors and a memory, wherein one or more programs are stored in the memory, configured to be executed by the one or more processors, and configured to execute the method as mentioned above.

In a fourth aspect, the present disclosure provides a computer-readable storage medium with program codes stored thereon, when the program codes are operated by a processor, to execute the method as mentioned above.

BRIEF DESCRIPTION OF DRAWINGS

To illustrate technical solutions of embodiments of the present disclosure more clearly, the drawings that need to be used in the description of the embodiments will be briefly introduced as follows. Obviously, the drawings are merely some embodiments of the present disclosure, and those skilled in the art may also obtain other drawings based on these accompanying drawings without creative efforts.

DETAILED DESCRIPTION

The technical solutions in the embodiments of the present disclosure will be clearly and completely described as below in conjunction with the drawings in the embodiments of the present disclosure. Obviously, the described embodiments are only a part of the embodiments of the present disclosure rather than all the embodiments. Based on the embodiments in the present disclosure, all other embodiments obtained by those of ordinary skill in the art without creative work shall fall within the protection scope of the present disclosure.

As the performance of hardware of electronic devices improves, more and more electronic devices can support video playback. For example, an electronic device can operate a video playback client, and then use the video playback client to play the video requested from the network, or the electronic device can run a web browser, and then play the video in the web browser, or the electronic device can play video files, that are locally stored, by video playback software.

Regardless of the video to be played and transmitted on the network or stored locally, when the video is generated, in order to reduce the occupation of storage space and facilitate transmission on the network, the generated video will be compressed. Correspondingly, when the electronic device acquires the video, it will first obtain the video that is compressed and encoded. In this case, the electronic device will first perform a video decoding process on the video that is compressed and encoded.

Figure 1:
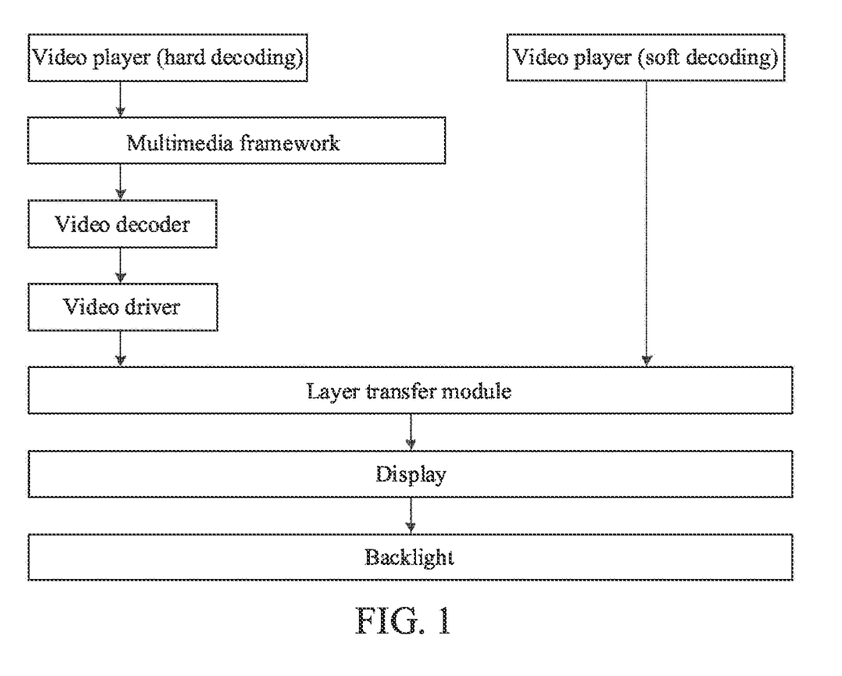
FIG. 1 is a schematic diagram illustrating a video processing architecture proposed in an embodiment of the present disclosure.

Generally, as shown in FIG. 1, the electronic device can decode a video in two manners: hard decoding and soft decoding. Hard decoding refers to the use of a non-central processing unit (non-CPU) for the decoding, such as a graphics processing unit (GPU), a dedicated digital signal processor (DSP), a field-programmable gate array (FPGA), or an application-specific integrated circuit (ASIC) chip. In addition, soft decoding refers to the use of a central processing unit (CPU) for decoding.

Specifically, as shown in FIG. 1, a media-framework (i.e., a MediaFramework) acquires video files to be played through an application-programming interface (API) to the client or web browser. The video files to be played are submitted to a video decoder. The media-framework is a multimedia framework in an operating system.

Regardless of the hard or soft decoding, after video data is decoded, the decoded video data will be sent to SurfaceFlinger (i.e., a layer transfer module), and the decoded video data will be rendered and synthesized by SurfaceFlinger, and then displayed on a screen. In addition, SurfaceFlinger is an independent service, which receives all surfaces as an input, and calculates one position of each surface in a final composite image according to parameters, such as ZOrder, transparency, size, and location. Then, the position of each surface in the final composite image will be submitted to HWComposer or OpenGL to generate a final display buffer and then be displayed on a specific display device.

The inventor found that a visual enhancement process can be added to a process of either hard decoding or soft decoding. The subsequently played video has a higher visual effect. For example, the video can be removed noise on edges, adjusted in exposure degree, or improve definition based on Hollywood quality video (HQV) technology. In addition, other means can also be used to improve visual experience of the video being played, e.g., by enhancing vividness of colors.

However, the inventor further discovered that the control over decoding the played video still needs to be improved. For example, bitrates of different videos are usually different. Generally, the electronic device does not consider the impact of the bitrate of video on decoding quality and decoding consumption during a video decoding process, so that regardless of the bitrate of video, the electronic device processes the video according to a fixed decoding method in the video decoding process. In addition, for example, with the increase of video formats, in order to facilitate adaptation of more video formats, there are more application programs decoding the video in a manner of soft decoding by default. It can be understood that because the soft decoding refers to decoding in a software manner, it can be adapted to all video formats, while hard decoding is limited by circuits and can only be adapted to a part of the video formats. When there are more application programs configured to decode video by the soft decoding, a burden on the CPU will increase. Therefore, a video decoding control method, apparatus, electronic device, and storage medium proposed by the present disclosure can improve intelligence and control convenience.

The content of the present disclosure will be introduced below in conjunction with specific embodiments.

Figure 2:
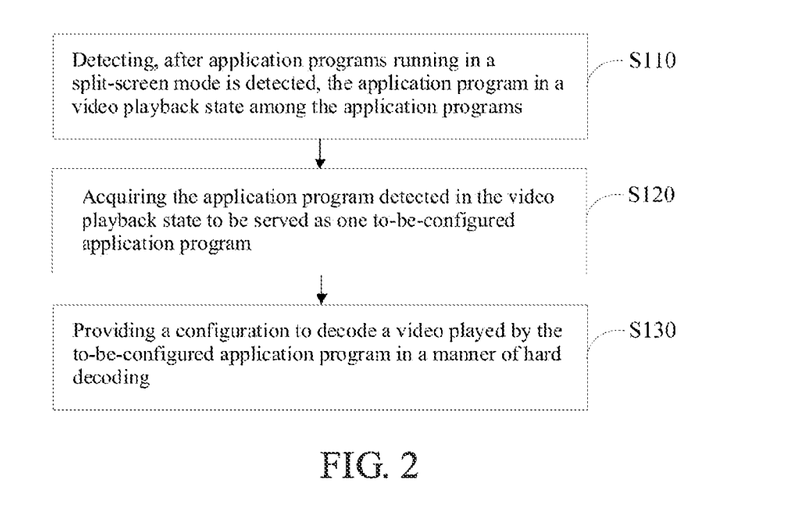
FIG. 2 is a flowchart illustrating a video decoding control method proposed in an embodiment of the present disclosure.

Please refer to FIG. 2, the present disclosure provides a video decoding control method, which is applied to an electronic device, wherein the method includes as follows.

Procedure S110, detecting, after a plurality of application programs running in a split-screen mode is detected, one or more application programs in a video playback state among the plurality of application programs.

In the present disclosure, the electronic device can identify whether a current state is in a video playback state in various ways.

As a way, detecting whether the electronic device is in the video playback state includes checking whether any one of given video playback application programs is running; if one of the given video playback application programs being running is detected, determining the electronic device being in the video playback state. In addition, the electronic device can pre-establish a list of video playback application programs to record the video playback application programs in the list. In addition, the list can be freely configured by a user of the electronic device or can also be determined based on the usage of a certain video playback application program.

Figure 3:
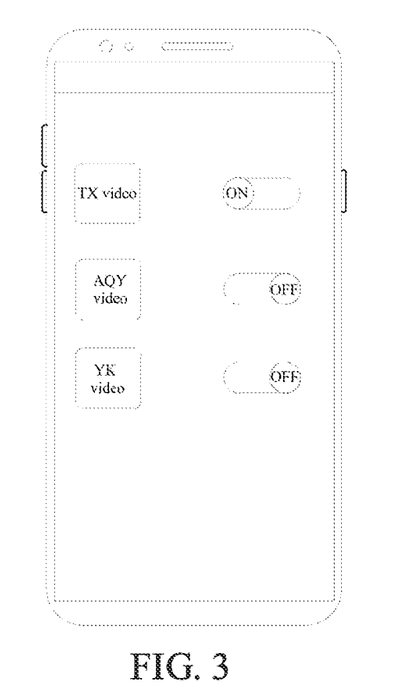
FIG. 3 is a schematic diagram illustrating a switching control member of an application program proposed in an embodiment of the present disclosure.

For example, as shown in FIG. 3, which shows a plurality of application programs displayed in an interface and status corresponds to each application program. It can be understood that if the status corresponding to the application program is "OFF," as shown in the figure, it means that the application program is removed or not added to the above list. If the status corresponding to the application program is "ON," as shown in the figure, it means that the application program has been added to the above list. For example, for an application program named "TX video," its corresponding status is "ON," which means that an application program, "TX video," will exist in the list as mentioned above. For the application program named "AQY video," the corresponding status is "OFF," which means that an application program "AQY video" will not exist in the list as mentioned above.

In addition, the electronic device can detect usage frequency of each video playback application program. If the electronic device detects that the usage frequency of a certain video playback program exceeds a given frequency, it can add the video playback application program to the list as mentioned above. Correspondingly, a name of the video playback application program is configured as "ON" in a corresponding state, as shown in FIG. 3.

In this case, the electronic device can first detect which application program is currently running in the foreground and then further detect whether the application program currently running in the foreground is in the list. If yes, it is determined that the application program is currently in the video playing state. In addition, as a way, if the electronic device is operated by an Android™ operating system, the name of the application program currently running in the foreground can be obtained by a method of executing a getRunningTasks of an ActivityManager. In addition, the electronic device can also obtain a list of programs used by the user through the UsageStatsManager to identify the most recently used application program recorded in the list as the current foreground application program. Furthermore, the electronic device can monitor the change of window focus through a built-in barrier-free function of the Android™ and get a package name corresponding to the focused window as the application program currently running in the foreground.

As another way, the electronic device can also detect a return value of an AudioManager class to determine whether there is a video playing. In this case, the electronic device can first detect the return value of the AudioManager class to determine whether there is audio output. If the audio output is detected, it can further determine whether there is a video playback application program running according to the detection as mentioned above to determine whether the device is in the video playback state.

Figure 4:
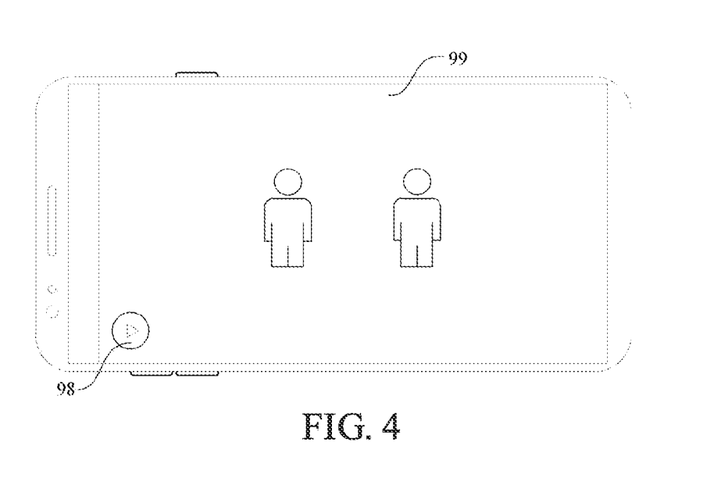
FIG. 4 is a schematic diagram illustrating a video-playing interface proposed in an embodiment of the present disclosure.

Furthermore, as yet another way, the electronic device can also detect whether it is in the video playback state by detecting a touch state of a video playback button. For example, as shown in FIG. 4, a play button 98 is displayed in a video playback interface 99. In addition, the interface shown in FIG. 4 is in a state in which the video playback is paused. In this case, when the play button 98 is detected as being touched, it can be determined that the electronic device is currently in the video playback state.

Procedure S120, acquiring the one or more application programs detected in the video playback state to serve as one or more to-be-configured application programs.

Procedure S130, providing a configuration to decode a video played by the one or more to-be-configured application programs in a manner of hard decoding.

It can be understood that a required application program will be configured to have a default decoding manner. When the application program is playing a video, it will first decode the played video according to the default decoding method. In this case, the electronic device can divide the to-be-configured application programs into application programs that are configured to perform soft decoding by default, and application programs that are not configured to have a default decoding method. In addition, for an application program configured to perform soft decoding by default, the electronic device can intercept a request for the soft decoding and directly perform hard decoding on the video data.

As a way, it can be understood that in the process of soft decoding, the operating system controls the CPU to process data. Usually, the request for the soft decoding is firstly sent to the operating system (which may also be understood as an electronic device), and the operating system responds. For some application programs, after the application programs are configured to perform the soft decoding, a mechanism for detecting response information will be configured. For example, the application program can be configured to detect whether the operating system returns a response message regarding successful soft decoding after a request for the soft decoding is sent to the operating system. If it is determined that the response message regarding successful soft decoding is not returned, the application program will try to send the request for the soft decoding again. In this case, the electronic device intercepts the original request for the soft decoding and starts to perform hard decoding, but the application program will misunderstand that the decoding has not yet started and then continue to send requests for the soft decoding to the operating system. Thus, it may cause not only data errors but also a waste of resources and may also affect the performance of the electronic device.

To avoid the above problem, for the application program that is configured to perform the soft decoding by default, in addition to that the electronic device directly intercepts the request for the soft decoding sent by the application program, the electronic device will also return the response information that the soft decoding has been successfully performed (although hard decoding is performed) to the application program so that the application program will not send a request for the soft decoding again, so as to avoid data errors and reduce power consumption.

The present disclosure provides a video decoding control method. After a plurality of application programs running in a split-screen mode is detected, detecting one or more application programs in a video playback state among the plurality of application programs, and then acquiring the one or more application programs detected in the video playback state to serve as one or more to-be-configured application programs, and finally providing a configuration to decode a video played by the one or more to-be-configured application programs in a manner of hard decoding. The present method realizes that when the plurality of application programs are in a split-screen display mode and in the case of all of the plurality of application programs with a video playback function, decoding a video played by the application programs in the hard decoding manner will be configured. Thus, the load ratio of the CPU is reduced, thereby allowing the CPU to have more processing power to process other tasks, reducing the probability of the electronic device being lagging, and improving the user experience.

Figure 5:
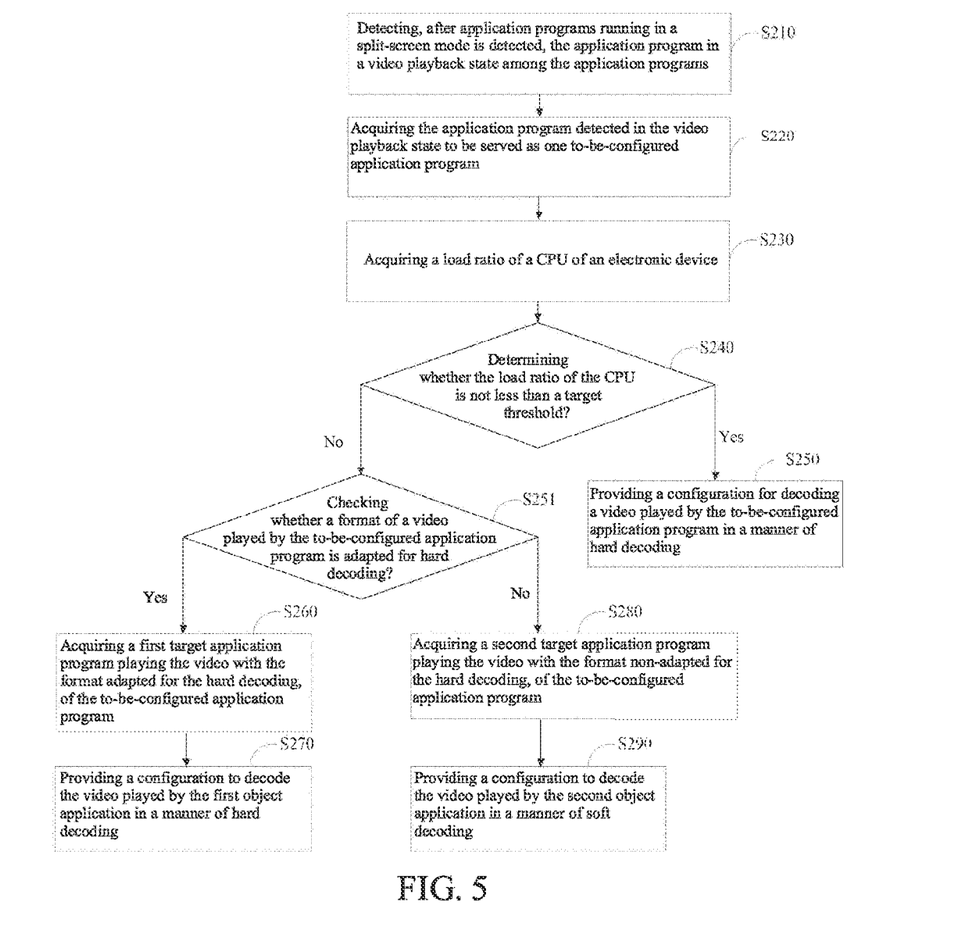
FIG. 5 is a flowchart illustrating a video decoding control method proposed in another embodiment of the present disclosure.

Please refer to FIG. 5, the present disclosure provides a video decoding control method, which is applied to an electronic device, wherein the method includes as follows.

Procedure S210, detecting, after a plurality of application programs running in a split-screen mode is detected, one or more application programs in a video playback state among the plurality of application programs.

Procedure S220, acquiring the one or more application programs detected in the video playback state to serve as one or more to-be-configured application programs.

Procedure S230, acquiring a load ratio of the CPU of the electronic device.

It should be noted that the load ratio of the CPU usually refers to a ratio of the number of tasks currently being processed or waiting to be processed and the maximum number of tasks that the CPU can process at the same time. As a way, the electronic device may directly use an adapted actual load ratio of the CPU as the load ratio of the CPU acquired in procedure S230.

It can be understood that there are usually various application programs installed in an electronic device. Different application programs will be given different tasks that need to be processed. Because the application programs in the electronic device may start running at different times, the load ratio of the CPU of the electronic device will be in a situation of dynamic variation. For example, in the case that the electronic device is installed with application programs A, B, and C, if only the application program A is currently running, the electronic device can detect that the actual load ratio of the CPU is 30%. After the application program B starts running, the electronic device may detect that the actual load ratio of the CPU has reached 40%. Furthermore, if it is detected that the application program C is also running, the electronic device may detect that the actual load ratio of the CPU has reached 50%. The present disclosure proposes an implementation method for avoiding a sudden increase in the load ratio of the CPU and causing a lagging situation. The current actual load ratio of the CPU can be obtained to estimate an added load ratio of the CPU during a specified length of time. Thus, the load ratio of the CPU can be obtained based on the added load ratio of the CPU and the actual load ratio of the CPU.

As a way, the estimating an added load ratio of the CPU during a specified length of time includes estimating an added load of the CPU during the specified length of time based on at least one of conditions: a historic load of the CPU corresponding to the application programs that are currently running; and a historic load of the CPU corresponding to the application program that ran during the specified length of time.

It can be understood that although the load of the CPU occupied by each application program in the electronic device is different, the electronic device can make a certain degree of estimation when some application programs will be started. For example, the electronic device can count running time of each application program and then calculate common running period of time of a certain application program, and then can infer that the application program will be started at which time of the day. Thus, in this way, it can anticipate whether the application program will be run in advance within a certain period of time.

It can be understood that some application programs generally start updating information or requesting data from the network at a preset moment. For example, for a browser-liked application program and some web data, even though a user operation interface of the browser is not started, the application program can still run in the background so that data can be quickly displayed to the user when the user triggers the display of the user operation interface. It can be understood that when a browser-like application program is updating in the background or requesting network data, the load of the CPU will be inevitably occupied to increase the load ratio of the CPU.

In addition, except for the application program, a system program of the electronic device is also regularly activated for data processing. Although the system program of the electronic device does not have a corresponding user operation interface, the system program will still be activated during a preset period of time to process the background data of the electronic device. Correspondingly, the system program of the electronic device will also occupy the load of the CPU during the running process to increase the load ratio of the CPU.

As a way, the electronic device may be configured to have a data table to store periods of running the application programs or the system program obtained in a statistics manner. After the electronic device starts to play the video and is in the video playback state, the electronic device can detect whether an application or system program is activated during a specified length of time, and then estimate the added load ratio of the CPU during the specified length of time.

Optionally, the above specified length of time can be a length of the video being played. In this case, after a video playback state is detected by the electronic device, the electronic device can obtain the length of the played video, use the obtained length as the specified length of time, and then further determine whether there will be the application program or the system program activated during the specified length of time. Then, the added load ratio of the CPU during the specified length of time is estimated. Then, a highest load ratio of the CPU during the video play process is determined based on the estimated added load ratio of the CPU, and then the obtained highest load ratio of the CPU is used as the load ratio of the CPU.

Procedure S240, determining whether the load ratio of the CPU is not less than a target threshold.

Procedure S250, if the load ratio of the CPU not less than the target threshold is determined, providing a configuration to decode a video played by the one or more to-be-configured application programs in the manner of hard decoding.

Procedure S251, if the load ratio of the CPU less than the target threshold is determined, checking whether a format of the video played by the one or more to-be-configured application programs is adapted for the hard decoding.

As a way, the electronic device can pre-configure a data table for storing correspondences between formats of videos and manners of decoding to record the manner of decoding corresponding to each video format. In this case, the electronic device can determine whether the format of the video played by the one or more to-be-configured application programs is adapted for the hard decoding based on a look-up table.

As another way, the electronic device can perform a soft decoding process and a hard decoding process on the video played by the one or more to-be-configured application programs, and then determine, by comparing qualities of an image of the video obtained by the soft decoding process and the hard decoding process, whether the format of the video played by the one or more to-be-configured application programs is adapted for the hard decoding. In addition, performing each of soft decoding and hard decoding can be understood as decoding a frame of an image, wherein the quality of the image can be determined by resolution and noise.

Optionally, the electronic device can acquire the resolutions of the images in many ways.

It can be understood that if an image has been blurred and a blurred process is performed on the image again, then high-frequency components in the image will not change too much. However, if the clarity of the image is high and a blurred process is performed on the image again, then the high-frequency components will change greatly. Then, as a way, the electronic device can perform a blur process (for example, a Gaussian blur process) on a target image (the above-mentioned parsed frame of image) to obtain a degraded image corresponding to the image. Then, by comparing changes of values of adjacent pixels of the image before the blurred processing with the image after the blurred processing, the value of the clarity is determined according to a degree of the change, and then the determined clarity is used to be as the resolution. In this case, if the change is large, then the clarity of the target image is high, and the resolution is high.

In addition, in addition to that, the clarity of the target image is determined by the above-mentioned blurring processing, other methods may also be used to calculate the clarity. Optionally, by the following calculation formula, $$D(f)=\Sigma_y \Sigma_x |f(x+2,y)-f(x,y)|^2$$

The clarity can be determined, wherein f(x,y) denotes a grayscale value of a pixel (x,y) corresponding to an image f, D(f) denotes a calculation result of the clarity of the image, and then the result can be used as the resolution. Optionally, in the present disclosure, f(x,y) can be selected from a high-frequency area in a real-time previewed image.

Optionally, if the currently played video provides multiple resolutions for the user to choose, the resolution of the current video can be obtained by reading the resolution of the played video selected by the user.

The electronic device can select the image with a higher resolution to be the image with better quality by comparing resolutions of the images obtained by the hard decoding and soft decoding.

Furthermore, except for the resolution, the determination can be performed by determining the number of noise points.

Moreover, it can be understood that if there are noise points in the image, the noise points may exist in an area of edge (i.e., a high-frequency component area) or areas other than the edge in the image. But, the noise points along the edge are not visually obvious. As a way, in order to reduce estimation time, a mobile terminal can only detect the noise points outside the edge. Because edge detection will be affected by the noise points, the mobile terminal can perform a preprocessing of filtering the noise points before edge detection. Optionally, the mobile terminal can eliminate a part of noise points by using a mean filtering manner. The image g(x,y) that is processed by the mean filtering manner is shown as:

$$g(x, y) = \frac{1}{3 \times 3} \left[ \sum_{i=-1}^{1} \sum_{j=-1}^{1} f(x+i, y+j) \right].$$

Correspondingly, candidate noise points are shown as:

$$D_h(x, y) = |g(x, y+1) - g(x, y-1)|,$$

$$D_{h-mean} = \frac{1}{M \times N} \sum_{x=1}^{M} \sum_{y=1}^{N} D_h(x, y).$$

Similarly, the corresponding values in a vertical direction can be calculated. Then, the candidate noise points are shown as:

$$N_{cand}(x, y) = \begin{cases} \max(D_v(x, y), & \text{if } D_h(x, y) < D_{h-mean} \text{ and} \\ \max(D_h(x, y)) & D_v(x, y) < D_{v-mean} \\ 0 & \text{otherwise} \end{cases}.$$

$N_{cand}(x,y)$ denotes a noise point that is detected. After a statistics process, the number of noise points in the real-time previewed image can be obtained.

In this case, the electronic device can set an image with fewer noise points as an image with better quality.

Procedure S260, acquiring a first target application program that is one application program playing the video with the format adapted for the hard decoding, of the one or more to-be-configured application programs.

Procedure S270, providing a configuration to decode the video played by the first target application program in a manner of hard decoding.

Procedure S280, acquiring a second target application program that is one application program playing the video with a format non-adapted for the hard decoding, of the one or more to-be-configured application programs.

Procedure S290, providing a configuration to decode the video played by the second target application program in a manner of soft decoding.

The present disclosure provides a video decoding control method. After a plurality of application programs running in a split-screen mode is detected, detecting one or more application programs in a video playback state among the plurality of application programs. Then, the one or more application programs detected in the video playback state are acquired to serve as one or more to-be-configured application programs. Then, the video played by those application programs in a manner of hard decoding will be determined according to the situation of a load ratio of the CPU of the electronic device. Therefore, the present method implements that, in the case of the application programs running in the split-screen mode and having a video playback capability, it is configured that the video played by the application programs running in the split-screen mode will be decoded in the manner of hard decoding. Thus, the load ratio of the CPU is reduced, thereby allowing the CPU to have more processing power to process other tasks, reducing the probability of the electronic device being lagging, and improving the user experience. It also improves flexibility of control of the decoding method.

Figure 6:
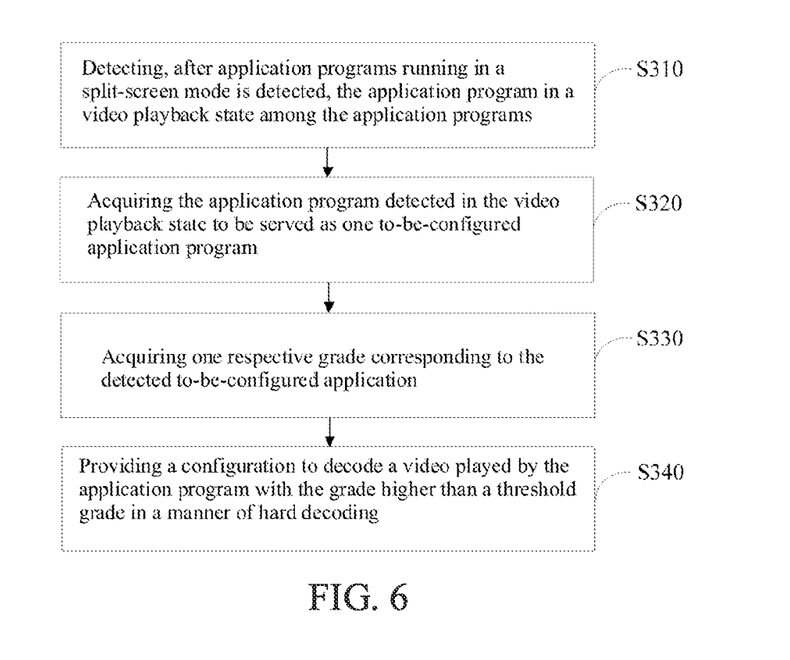
FIG. 6 is a flowchart illustrating a video decoding control method proposed in yet another embodiment of the present disclosure.

Please refer to FIG. 6, the present disclosure provides a video decoding control method, which is applied to an electronic device, wherein the method includes as follows.

Procedure S310, detecting, after a plurality of application programs running in a split-screen mode is detected, one or more application programs in a video playback state among the plurality of application programs.

Procedure S320, acquiring the one or more application programs detected in the video playback state to serve as one or more to-be-configured application programs.

Procedure S330, acquiring one or more respective grades corresponding to the one or more detected to-be-configured application programs.

As a way, the acquiring one or more respective grades corresponding to the one or more detected to-be-configured application programs includes finding the one or more respective grades corresponding to the one or more detected to-be-configured application programs in a given data table; if the one or more grades corresponding to the one or more to-be-configured application programs are unfound in the given data table, acquiring one application program in the same category to the one or more application programs corresponding to the one or more unfound grades; and providing the grade corresponding to the application program in the same category to serve as the one or more unfound grades corresponding to the one or more to-be-configured application programs.

It can be understood that after the electronic device detects that an application program has been installed, the electronic device can assign a grade to the installed application program. The grade that has a higher value or a lower value can be determined according to the main function of the application program. In an embodiment of the present disclosure, As a way, the grade of the application program dedicated to playing video can be configured to be the highest grade. In addition, if the application program with the video playback function, but its primary function is not used for video playback. The grade of the application program can be configured as the second-highest grade.

Procedure S340, providing a configuration to decode a video played by one application program having the grade higher than a threshold grade, of the one or more to-be-configured application programs, in a manner of hard decoding.

The present disclosure provides a video decoding control method. After a plurality of application programs running in a split-screen mode is detected, detecting one or more application programs in a video playback state among the plurality of application programs. Then, the one or more application programs detected in the video playback state are acquired to serve as one or more to-be-configured application programs. Then, a respective grade corresponding to each detected to-be-configured application program is detected, and one application program having the grade higher than a threshold grade is acquired. Finally, it provides a configuration to decode a video played by one application program corresponding to the grade higher than a threshold grade, of the one or more to-be-configured application programs, in a manner of hard decoding. Therefore, the present method implements that, in the case of the application programs running in the split-screen mode and having a video playback capability, it is configured that the video played by the application programs running in the split-screen mode will be decoded in the manner of hard decoding. Thus, the load ratio of the CPU is reduced, thereby allowing the CPU to have more processing power to process other tasks, reducing the probability of the electronic device being lagging, and improving the user experience.

Figure 7:
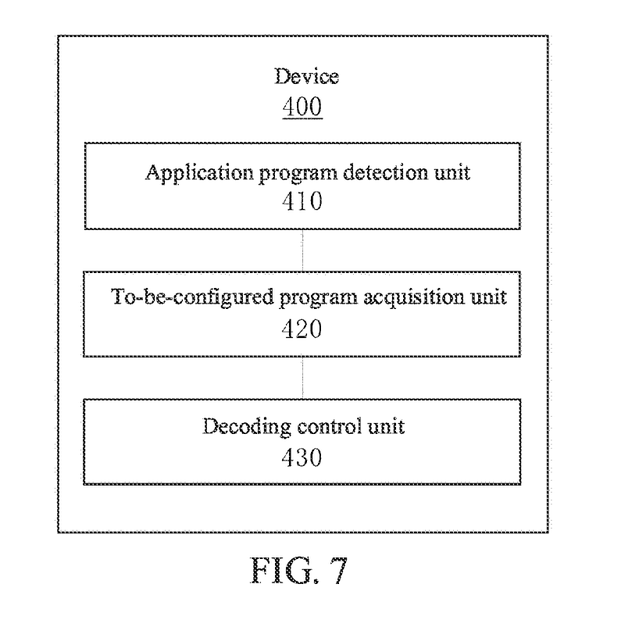
FIG. 7 is a block diagram illustrating a video decoding control apparatus proposed in an embodiment of the present disclosure.

Please refer to FIG. 7, the present disclosure provides a video decoding control apparatus 400, which is operated in an electronic device, wherein the apparatus 400 includes an application program detection unit 410, a to-be-configured program acquisition unit 420, and a decoding control unit 430.

The application program detection unit 410 is configured to detect, after a plurality of application programs running in a split-screen mode is detected, one or more application programs in a video playback state among the plurality of application programs.

The to-be-configured program acquisition unit 420 is configured to acquire the one or more application programs detected in the video playback state to serve as one or more to-be-configured application programs.

The decoding control unit 430 is configured to provide a configuration to decode a video played by the one or more to-be-configured application programs in a manner of hard decoding.

It can be understood that the desired application program will configure a default manner of decoding. When the application program is playing a video, the application program will first decode the played video according to the default manner of decoding. In this case, the electronic device can divide the to-be-configured application programs into the applications that perform soft decoding by default and the applications that are not configured to have a default manner of decoding. In addition, the decoding control unit 430 is specifically configured to perform the application program in soft decoding by default. The electronic device can intercept its request for the soft decoding, and directly perform hard decoding on video data.

Figure 8:
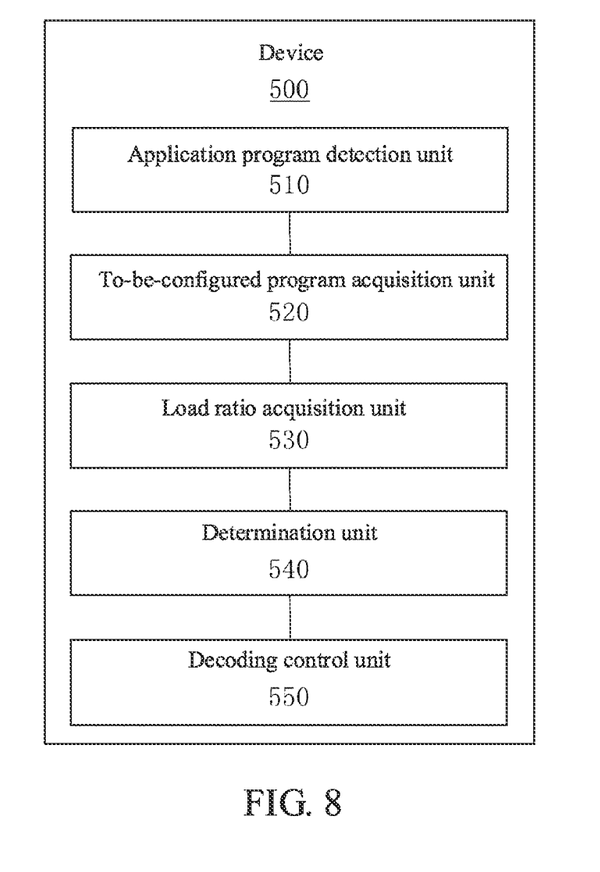
FIG. 8 is a block diagram illustrating a video decoding control apparatus proposed in another embodiment of the present disclosure.

Please refer to FIG. 8, the present disclosure provides a video decoding control apparatus 500, which is operated in an electronic device, wherein the apparatus 500 includes an application program detection unit 510, a to-be-configured program acquisition unit 520, a load ratio acquisition unit 530, a determination unit 540, and a decoding control unit 550.

The application program detection unit 510 is configured to detect, after a plurality of application programs running in a split-screen mode is detected, one or more application programs in a video playback state among the plurality of application programs.

The to-be-configured program acquisition unit 520 is configured to acquire the one or more application programs detected in the video playback state to serve as one or more to-be-configured application programs.

The load ratio acquisition unit 530 is configured to acquire a load ratio of a central processing unit (CPU) of the electronic device.

The determination unit 540 is configured to determine whether the load ratio of the CPU is not less than a target threshold.

The decoding control unit 550 is configured to perform a determination that if the load ratio of the CPU is not less than the target threshold, providing a configuration to decode a video played by the one or more to-be-configured application programs in a manner of hard decoding.

A format determination unit is configured to perform a determination that if the load ratio of the CPU is less than the target threshold, checking whether a format of the video played by the one or more to-be-configured application programs is adapted for the hard decoding.

The decoding control unit 550 is further configured to acquire a first target application program that is one application program playing the video with the format adapted for the hard decoding, of the one or more to-be-configured application programs, and providing a configuration to decode the video played by the first target application program in a manner of hard decoding.

The decoding control unit 550 is further configured to acquire a second target application program that is one application program playing the video with a format non-adapted for the hard decoding, of the one or more to-be-configured application programs; and providing a configuration to decode the video played by the second target application program in a manner of soft decoding.

Figure 9:
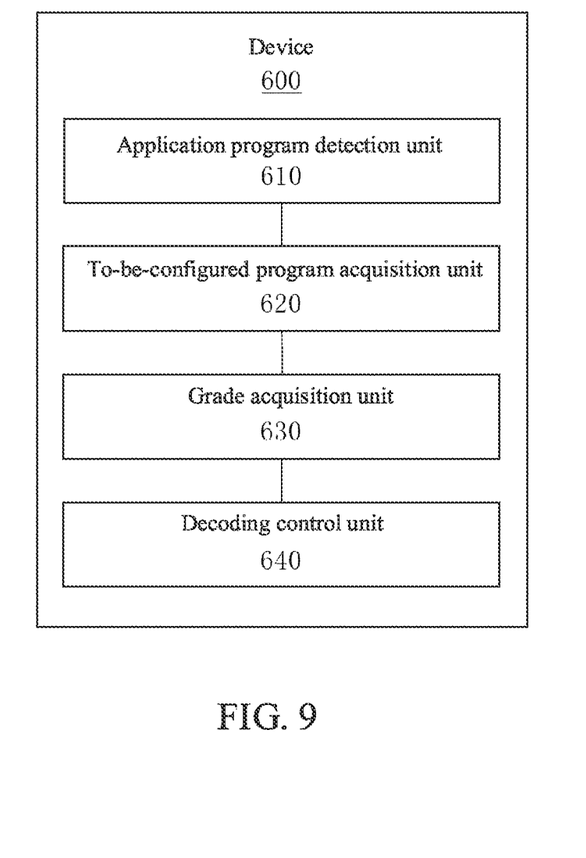
FIG. 9 is a block diagram illustrating a video decoding control apparatus proposed in yet another embodiment of the present disclosure.

Please refer to FIG. 9, the present disclosure provides a video decoding control apparatus 600, which is operated in an electronic device, wherein the apparatus 600 includes an application program detection unit 610, a to-be-configured program acquisition unit 620, a grade acquisition unit 630, and a decoding control unit 640.

The application program detection unit 610 is configured to detect, after a plurality of application programs running in a split-screen mode is detected, one or more application programs in a video playback state among the plurality of application programs.

The to-be-configured program acquisition unit 620 is configured to acquire the one or more application programs detected in the video playback state to serve as one or more to-be-configured application programs.

The grade acquisition unit 630 is configured to acquire one or more respective grades corresponding to the one or more detected to-be-configured application programs.

As a way, the acquiring one or more respective grades corresponding to the one or more detected to-be-configured application programs includes finding the one or more respective grades corresponding to the one or more detected to-be-configured application programs in a given data table; if the one or more grades corresponding to the one or more to-be-configured application programs are unfound in the given data table, acquiring one application program in the same category to the one or more application programs corresponding to the one or more unfound grades; and providing the grade corresponding to the application program in the same category to serve as the one or more unfound grades corresponding to the one or more to-be-configured application programs.

The decoding control unit 640 is providing a configuration to decode a video played by one application program having the grade higher than a threshold grade, of the one or more to-be-configured application programs, in a manner of hard decoding.

It should be noted that those skilled in the art can clearly understand that for the convenience and brevity of the description, the specific working process of the device and unit described as above can refer to the corresponding process in the above-mentioned method embodiment, which will not be repeated here. In the several embodiments provided in the present disclosure, the coupling between the modules may be electrical, mechanical or other forms of coupling. In addition, each functional module in each embodiment of the present disclosure may be integrated into one processing module, or each module may exist alone physically, or two or more modules may be integrated into one module. The above-mentioned integrated modules can be implemented in the form of hardware or software functional modules.

It should be noted that in the present disclosure, how to encode audio data according to audio encoding manner can adopt the existing technology, which will not be described in detail in the present disclosure.

In summary, the present disclosure provides a video decoding control method, apparatus, electronic device, and storage medium, after a plurality of application programs running in a split-screen mode is detected, one or more application programs in a video playback state among the plurality of application programs is detected. Then, the one or more application programs detected in the video playback state are acquired to serve as one or more to-be-configured application programs. Finally, it provides a configuration to decode a video played by one application program corresponding to the grade higher than a threshold grade, of the one or more to-be-configured application program, in a manner of hard decoding. Therefore, the present method implements that, in the case of the application programs running in the split-screen mode and having a video playback capability, it is configured that the video played by the application programs running in the split-screen mode will be decoded in the manner of hard decoding. Thus, the load ratio of the CPU is reduced, thereby allowing the CPU to have more processing power to process other tasks, reducing the probability of the electronic device being lagging, and improving the user experience.

An electronic device provided by the present disclosure will be described with reference to FIG. 10, as below.

Figure 10:
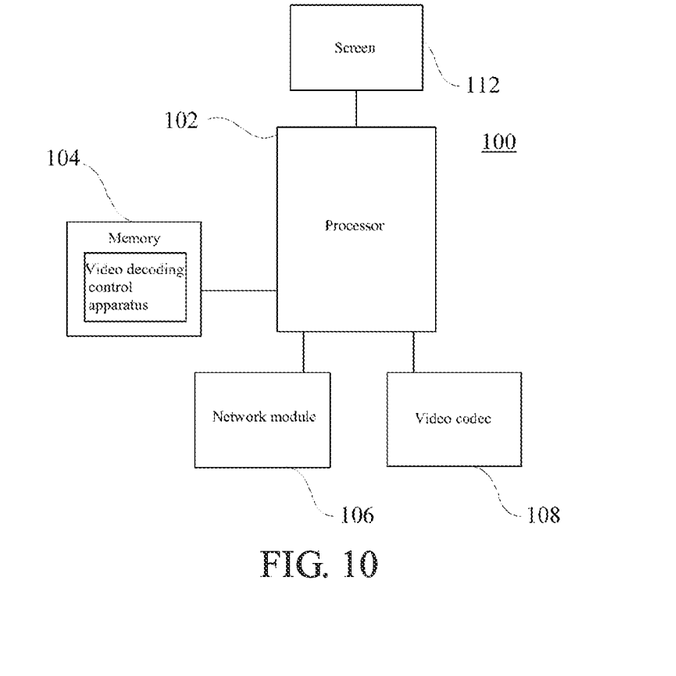
FIG. 10 is a block diagram illustrating an electronic device configured to execute a video decoding control method in accordance with an embodiment of the present disclosure.

Please refer to FIG. 10, based on the above video decoding control method and apparatus, an embodiment of the present disclosure also provides another electronic device 100 that can execute the above video decoding control method. The electronic device 100 includes one or more (only one shown in the figure) processors 102, a memory 104, a network module 106, a video codec 108, and a screen 112 coupled to each other. The memory 104 stores programs that can execute the content in the above embodiment. The processor 102 can execute the programs stored in the memory 104.

The processor 102 may include one or more processing cores. The processor 102 uses various interfaces and wires to connect various parts within the entire electronic device 100 and executes various functions and processing data of the electronic device 100 by running or executing instructions, programs, code sets, or instruction sets stored in the memory 104, and calling data stored in the memory 104. Various functions and processing data of the electronic device 100. Optionally, the processor 102 may be implemented by adopting at least one of a digital signal processor (DSP), a field-programmable gate array (FPGA), and a programmable logic array (PLA). The processor 102 may be integrated with one or a combination of a central processing unit (CPU), a graphics processor unit (GPU), and a modem. In addition, the CPU mainly processes the operating system, user interface, and application programs. In addition, the GPU is configured to render and draw of display content. In addition, the modem is configured to process wireless communication. It can be understood that the above-mentioned modem may also not be integrated into the processor 102, but may be implemented by a single communication chip.

The memory 104 may include a random access memory (RAM), and may also include a read-only memory. The memory 104 may be configured to store instructions, programs, codes, code sets or instruction sets. The memory 104 may include a program storage area and a data storage area. For example, a video decoding control apparatus may be stored in the memory 104. In addition, the video decoding control apparatus may be the above device 400, device 500, or device 600. In addition, the program storage area can store instructions configured to implement the operating system, instructions configured to implement at least one function (such as touch function, sound playback function, image playback function), and instructions configured to implement the following various method embodiments. In addition, the data storage area can further store data (such as phone book, data of audio and video, and chat record data) created by the terminal 100 during use.

The network module 106 is configured to receive and transmit electromagnetic waves, realize the mutual conversion between electromagnetic waves and electrical signals, so as to communicate with a communication network or other devices, such as communication with a wireless access point. In addition, the network module 106 may include various existing circuit elements for performing functions such as an antenna, a radio frequency transceiver, a digital signal processor, an encryption/decryption chip, a subscriber identity module (SIM) card, a memory. In addition, the network module 106 can communicate with various networks, such as the Internet, an intranet, and a wireless network, or communicate with other devices through a wireless network. The above wireless network may include a cellular telephone network, a wireless local area network, or a metropolitan area network.

The video codec 108 may be configured to decode the data requested by the network module 106 from the network, so as to be transmitted to the screen 112 for display. Specifically, the video codec 108 may be a GPU, a dedicated DSP, a FPGA, or an ASIC chip.

Figure 11:
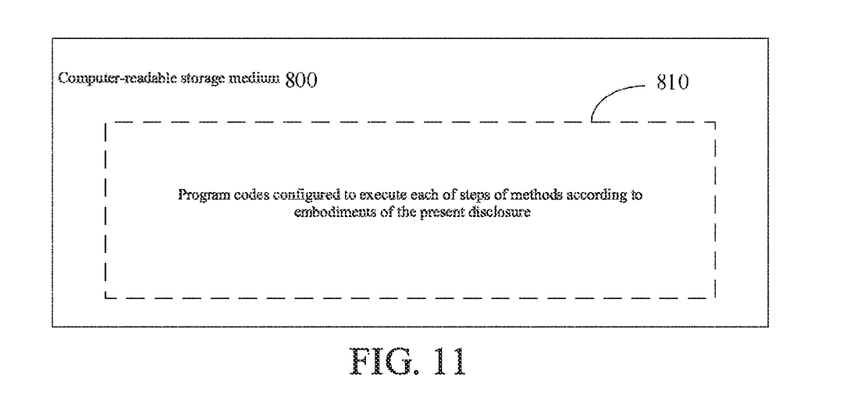
FIG. 11 is a storage unit configured to store or carry program codes implementing a video decoding control method in accordance with an embodiment of the present disclosure.

Please refer to FIG. 11, which shows a structural block diagram of a computer-readable storage medium provided by an embodiment of the present disclosure. The computer-readable storage medium 800 stores program codes. The program codes can be called by a processor to execute the method described in the method as mentioned above embodiments.

The computer-readable storage medium 800 may be an electronic memory, such as a flash memory, an electrically erasable programmable read only memory (EEPROM), an EPROM, a hard disk, or a ROM. Optionally, the computer-readable storage medium 800 includes a non-transitory computer-readable storage medium. In addition, the computer-readable storage medium 800 has a storage space for executing the program codes 810 of any procedure in the above-mentioned methods. In addition, these program codes can be read from or written into one or more computer program products. In addition, the program code 810 may be, for example, compressed in a suitable form.

Finally, it should be noted that, the above embodiments are only used to illustrate the technical solutions of the present disclosure, and are not to be limited thereto. Although the present disclosure has been described in detail with reference to the above-mentioned embodiments, those of ordinary skill in the art should understand that the technical solutions recorded in the above embodiments can be modified or a part of the technical features can be equivalently replaced. These modifications or replacements do not drive the essence of the corresponding technical solutions to deviate from the spirit and scope of the technical solutions of the embodiments of the present disclosure.

What is claimed is:

1. A video decoding control method, for an electronic device, comprising:
   detecting, in response to detecting a plurality of application programs running in a split-screen mode, one or more application programs in a video playback state among the plurality of application programs;
   acquiring the one or more application programs detected in the video playback state to serve as one or more to-be-configured application programs; and
   providing a configuration to decode a video played by the one or more to-be-configured application programs in a manner of hard decoding;
   wherein prior to the providing a configuration to decode a video played by the one or more to-be-configured application programs in a manner of hard decoding, the method further comprises:
   acquiring a load ratio of a central processing unit (CPU) of the electronic device;
   determining whether the load ratio of the CPU is not less than a target threshold; and
   executing, in response to the load ratio of the CPU not less than the target threshold being determined, the providing a configuration to decode a video played by the one or more to-be-configured application programs in a manner of hard decoding.

2. The video decoding control method according to claim 1, wherein the acquiring a load ratio of a CPU of the electronic device comprises:
   acquiring an actual load ratio of the CPU of the electronic device;
   estimating an added load ratio of the CPU during a specified length of time, based on an application program that is currently in a running state on the electronic device; and
   obtaining the load ratio of the CPU, based on the actual load ratio of the CPU and the added load ratio of the CPU.

3. The video decoding control method according to claim 2, wherein the estimating an added load ratio of the CPU during a specified length of time comprises estimating an added load of the CPU during the specified length of time based on at least one of conditions:
   a historic load of the CPU corresponding to the application program that is currently running; and
   a historic load of the CPU corresponding to the application program that ran during the specified length of time.

4. The video decoding control method according to claim 1, further comprising:
   checking, in response to the load ratio of the CPU less than the target threshold being determined, whether a format of the video played by the one or more to-be-configured application programs is adapted for the hard decoding;
   acquiring a first target application program that is one application program playing the video with the format adapted for the hard decoding, of the one or more to-be-configured application programs; and
   providing a configuration to decode the video played by the first target application program in a manner of hard decoding.

5. The video decoding control method according to claim 4, wherein the checking whether a format of the video played by the one or more to-be-configured application programs is adapted for the hard decoding comprises:
   acquiring the format of the video played by the one or more to-be-configured application programs;
   finding a manner of decoding corresponding to the format of the played video in a pre-configured data table, wherein a correspondence between the format of video and the manner of decoding is stored in the pre-configured data table; and
   determining whether the format of the played video is adapted for the hard decoding according to a finding result.

6. The video decoding control method according to claim 4, wherein the checking whether a format of the video played by the one or more to-be-configured application programs is adapted for the hard decoding comprises:
   performing a soft decoding process and a hard-decoding process on the video played by the one or more to-be-configured application programs; and
   determining, by comparing qualities of an image of the video obtained by the soft decoding process and the hard-decoding process, whether the format of the video played by the one or more to-be-configured application programs is adapted for the hard decoding, wherein quality of the image is determined by resolution and noise.

7. The video decoding control method according to claim 4, further comprising:
   acquiring a second target application program, that is one application program playing the video with a format non-adapted for the hard decoding, of the one or more to-be-configured application programs; and
   providing a configuration to decode the video played by the second target application program in a manner of soft decoding.

8. A video decoding control method, for an electronic device, comprising:
   detecting, in response to detecting a plurality of application programs running in a split-screen mode, one or more application programs in a video playback state among the plurality of application programs;
   acquiring the one or more application programs detected in the video playback state to serve as one or more to-be-configured application programs; and
   providing a configuration to decode a video played by the one or more to-be-configured application programs in a manner of hard decoding, comprising:
   acquiring one or more respective grades corresponding to the one or more detected to-be-configured application programs; and
   providing a configuration to decode a video played by one application program, that corresponds to the grade higher than a threshold grade, of the one or more to-be-configured application programs, in a manner of hard decoding.

9. The video decoding control method according to claim 8, wherein the acquiring one or more respective grades corresponding to the one or more detected to-be-configured application programs comprises:
   finding the one or more respective grades corresponding to the one or more to-be-configured application programs detected in a given data table;
   acquiring, in response to that the one or more grades corresponding to the one or more to-be-configured application programs are unfound in the given data table, one application program in the same category to the one or more application programs corresponding to the one or more unfound grades; and providing the grade corresponding to the application program in the same category to serve as the one or more unfound grades corresponding to the one or more to-be-configured application programs.

10. The video decoding control method according to claim 1, wherein the one or more to-be-configured application programs comprise one application program configured to perform the soft decoding by default; and the providing a configuration to decode a video played by the one or more to-be-configured application programs in a manner of hard decoding comprises:

intercepting a request for the soft decoding to perform the hard decoding on data of the video played by the one or more to-be-configured application programs.

11. The video decoding control method according to claim 1, wherein the detecting one or more application programs in a video playback state among the plurality of application programs comprises:

detecting whether any one of the application programs is in the video playback state; and detecting, in response to detecting one of the application programs in the video playback state, the one or more application programs in the video playback state among the plurality of application programs.

12. The video decoding control method according to claim 11, wherein the detecting whether any one of the application programs is in the video playback state comprises:

checking whether any one of given video playback application programs is running; and determining, in response to detecting one of the given video playback application programs being running, there is one of the application programs in the video playback state.

13. The video decoding control method according to claim 11, wherein the detecting whether any one of the application programs is in the video playback state comprises:

acquiring one application program currently running in a foreground;

checking whether the running application program is in a pre-established list of the video playback application programs; and determining, in response to the running application program in the pre-established list of the video playback application programs being checked, there is one of the application programs in the video playback state.

14. The video decoding control method according to claim 13, wherein the acquiring one application program currently running in a foreground comprises:

acquiring a listed table of one or more application programs used by a user; and identifying the most recently used application program recorded in the listed table to be as the application program currently running in the foreground.

15. The video decoding control method according to claim 13, wherein the checking whether the running application program is in a pre-established list of the video playback application programs comprises:

detecting a usage frequency of the application programs; and determining, in response to the usage frequency being higher than a given frequency, the application program being in the pre-established list of video playback application programs.

16. The video decoding control method according to claim 11, wherein the detecting whether any one of the application programs is in the video playback state comprises:

detecting whether audio is outputted;

detecting, in response to detecting the outputted audio, whether there is the video playback application program running; and determining, in response to detecting the running video playback application program, there is one of the application programs in the video playback state.

17. An electronic device, comprising one or more processors and a memory;

wherein one or more programs are stored in the memory, configured to be executed by the one or more processors, and configured to execute a method comprising:

detecting, in response to detecting a plurality of application programs running in a split-screen mode, one or more application programs in a video playback state among the plurality of application programs;

acquiring the one or more application programs detected in the video playback state to serve as one or more to-be-configured application programs; and providing a configuration to decode a video played by the one or more to-be-configured application programs in a manner of hard decoding;

wherein prior to the providing a configuration to decode a video played by the one or more to-be-configured application programs in a manner of hard decoding, the method further comprises:

acquiring a load ratio of a central processing unit (CPU) of the electronic device;

determining whether the load ratio of the CPU is not less than a target threshold; and executing, in response to the load ratio of the CPU not less than the target threshold being determined, the providing a configuration to decode a video played by the one or more to-be-configured application programs in a manner of hard decoding.

18. The electronic device according to claim 17, wherein a video decoding control apparatus is operated in the electronic device, and the video decoding control apparatus comprises:

an application program detection unit configured to cause the processor to detect, in response to detecting the plurality of application programs running in the split-screen mode, one or more application programs in the video playback state among the plurality of application programs;

a to-be-configured program acquisition unit configured to cause the processor to acquire the one or more application programs detected in the video playback state to serve as one or more to-be-configured application programs; and a decoding control unit configured to cause the processor to provide the configuration to decode the video played by the one or more to-be-configured application programs in the manner of hard decoding.

19. A non-transitory computer-readable storage medium with program codes stored thereon, when the program codes are operated by a processor, to execute a method comprising:

detecting, in response to detecting a plurality of application programs running in a split-screen mode, one or more application programs in a video playback state among the plurality of application programs;

acquiring the one or more application programs detected in the video playback state to serve as one or more to-be-configured application programs; and providing a configuration to decode a video played by the one or more to-be-configured application programs in a manner of hard decoding;

wherein prior to the providing a configuration to decode a video played by the one or more to-be-configured application programs in a manner of hard decoding, the method further comprises:

acquiring a load ratio of a central processing unit (CPU) of the electronic device;

determining whether the load ratio of the CPU is not less than a target threshold; and     executing, in response to the load ratio of the CPU not less than the target threshold being determined, the providing a configuration to decode a video played by the one or more to-be-configured application programs in a manner of hard decoding.

\* \* \* \* \*